Dec. 9, 1958  F. M. PENNING  2,863,315
APPARATUS FOR DETECTING LEAKS IN VACUUM SYSTEMS
Filed Dec. 6, 1954
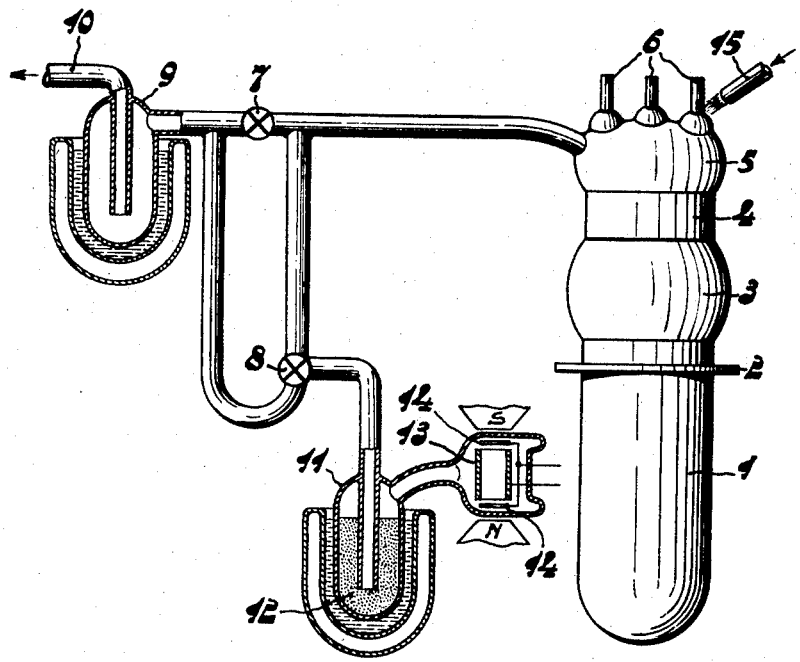
INVENTOR,
FRANS MICHEL PENNING, Deceased by
JORIS DANIEL HEIJLIGERS, Executor
BY
AGENT

United States Patent Office 2,863,315
Patented Dec. 9, 1958

2,863,315

APPARATUS FOR DETECTING LEAKS IN VACUUM SYSTEMS

Frans Michel Penning, deceased, late of Emmasingel, Eindhoven, Netherlands, by Joris Daniel Heijligers, executor, Emmasingel, Eindhoven, Netherlands, assignor, by mesne assignments, to North American Philips Company, Inc., New York, N. Y., a corporation of Delaware Application December 6, 1954, Serial No. 473,396

Claims priority, application Netherlands January 6, 1954

2 Claims. (Cl. 73—40.7)

The invention relates to an apparatus for detecting very small leaks in vacuum systems, more particularly discharge tubes, these systems being sprayed or surrounded by an indicating gas, of which the pressure in the system is measured by means of a sensitive manometer.

In a known method for detecting leaks the vacuum system to be examined is scanned by means of a hydrogen jet or arranged in a bell under a hydrogen atmosphere. The duct connecting the vacuum system with the manometer comprises a heated palladium diaphragm, mostly in the shape of a tube. This diaphragm is pervious to hydrogen only and to no other gases.

This has a disadvantage in that hydrocarbons give off hydrogen owing to decomposition of the hot palladium, so that an erroneous impression of a leak may be given. If no use is made of a manometer which rapidly burns away the penetrating hydrogen, it is difficult to localize two different leaks a short time one after the other. Moreover, the palladium may sometimes produce impurities.

The invention has for its object to provide a leak-detecting system which has advantages with respect to the known system.

According to the invention in an apparatus for detecting very small leaks in vacuum systems, more particularly discharge tubes, in which the system to be examined is sprayed or surrounded by an indicating gas, the pressure of which in the system is measured by means of a sensitive manometer, the vacuum system communicates with the manometer through a duct, which contains a quantity of absorbing material, which absorbs air and most other gases, but which allows the indicating gas to pass or absorbs it only to a smaller extent.

The absorbing material may be active carbon at a low temperature, the indicating gas being helium and, if necessary, hydrogen, although the latter is absorbed to a comparatively great extent, while active carbon can be cooled only with liquid nitrogen with a view to the risk of explosion.

Silica gel at low temperature has the advantage that the hydrogen is absorbed only to a small extent and that there is no risk of explosion. In this case helium may also be used as an indicating gas.

The advantage of an apparatus according to the invention is that the absorbing material does not give off gas, as the palladium may do, so that small leaks can be discovered. In the case of large leaks the absorbing material may be saturated too rapidly.

The invention will now be described more fully with reference to the accompanying drawing, which shows an apparatus according to the invention, comprising a discharge tube to be examined.

Referring to the drawing, reference numeral 1 designates the metal anode of a transmitting tube; this anode is provided with a flange 2 to fix it to the cooler housing. A glass ring 3 is sealed at one end to the anode and on the other end to the grid connecting ring 4. The grid ring 4 is closed by a glass head 5, in which three filament cathode supply-conductors are secured.

The exhaust tube of the transmitting tube communicates through the cock 7 with a cooler, which communicates through a duct 10 with an exhaust pump. The exhaust tube communicates moreover through the cock with a cooler 11, which contains a mass of silica gel 12. The cooler communicates at the other end with the manometer of the ionization gauge type, which is constituted by a cylindrical anode ring 13 and two cathode plates 14, which are arranged between the poles N and S of a magnet.

The coolers 9 and 11 are present to counteract the heat of absorption of the silica gel and to cool the exhaust tube 10. The absorption of the gas is dependent upon first, the absorption material and second, the nature of the gas. In this case, gases are rated as to their absorption isotherm characteristics by their tenacity. Thus, less tenacious gases will not be absorbed readily by the silica gel while tenacious gases will be absorbed. Elements at the beginning of the atomic table such as hydrogen and helium have a very low tenacity while air has a high tenacity, hence the result of air being absorbed and hydrogen being only partly absorbed.

The examination of the tube is carried out as follows. First, if necessary, the silica gel is degasified by heating; in this process the cock 7 is closed and the cock 8 is adjusted in a manner such that a cooler 11 communicates with the exhaust duct 10. Then the cock 8 is closed and the cock 7 is opened, so that the transmitting tube 1 can be evacuated. Then the cock 7 is closed and through the cock 8 the tube 1 communicates with the cooler 11 and the manometer. By means of a mouth piece 15 a jet of hydrogen is sprayed onto those areas of the tube where there are supposed to be leaks. Air leaking in is absorbed by the silica jelly 12, but the hydrogen is allowed to pass to the manometer. Since the type of manometer employed burns away the hydrogen, the manometer voltage may, if desired, be switched off for a few minutes, after which the pressure is measured.

What is claimed is:

1. A leak-detecting apparatus for vacuum systems comprising means for spraying said system with an indicating gas, a relatively sensitive manometer of the magnetic field type for measuring the pressure in said system, a duct arrangement communicating said vacuum system with the manometer, a quantity of absorbing material in said duct arrangement which permits at least a major portion of said indicating gas to pass therethrough while other gases are absorbed.

2. A leak-detecting apparatus for vacuum systems as set forth in claim 1 wherein said absorbing material is silica gel maintained at a low temperature and the indicating gas is hydrogen.

References Cited in the file of this patent

UNITED STATES PATENTS

| | | |
|---|---|---|
| 2,526,038 | Nelson | Oct. 17, 1950 |
| 2,601,272 | Frost | June 24, 1952 |
| 2,652,716 | Blears et al. | Sept. 22, 1953 |
| 2,671,337 | Hulsberg | Mar. 9, 1954 |